United States Patent [19]
Tagami et al.

[11] Patent Number: 5,889,483
[45] Date of Patent: Mar. 30, 1999

[54] MUTE SIGNAL PROCESSING CIRCUIT FOR ONE-BIT DIGITAL SIGNAL

[75] Inventors: Shigeo Tagami; Masaharu Yanari, both of Tokyo, Japan

[73] Assignee: Sony Corporation, Tokyo, Japan

[21] Appl. No.: 897,977

[22] Filed: Jul. 21, 1997

[30]  Foreign Application Priority Data

Aug. 22, 1996 [JP] Japan ................................. 8-221306

[51] Int. Cl.⁶ ...................................................... H03M 3/00

[52] U.S. Cl. ............................................................ 341/143

[58] Field of Search ............................................. 341/143

[56]  References Cited

U.S. PATENT DOCUMENTS 5,200,750  4/1993  Fushiki et al. ............................ 341/143
5,369,791  11/1994  Asghar et al. ............................ 375/346

Primary Examiner—Howard L. Williams
Attorney, Agent, or Firm—Jay H. Maioli

[57]  ABSTRACT

A signal processing device wherein an incoming one-bit digital audio signal is blocked by every predetermined bit-length block. Two consecutive blocked frames are compared and it is judged whether or not an integral value of each frame is a predetermined value. If a portion where coincidence between the frames and coincidence of the integral value continue for a predetermined period of time, mute processing is performed.

5 Claims, 4 Drawing Sheets

MUTE SIGNAL PROCESSING CIRCUIT FOR ONE-BIT DIGITAL SIGNAL

BACKGROUND OF THE INVENTION

1. Field of the Invention

This invention relates to a signal processing device for performing mute processing on a sigma-delta modulated one-bit signal.

2. Description of the Related Art

In a number of cases with a digital audio source, such as, a compact disc (CD) or a digital audio tape (DAT), a perfectly silent portion partly exists between programs or during musical performance. In a state of playback pause, an audio signal is muted. In the silent portion, since a 16-bit digital audio signal is formed in the form of consecutive 0000h or consecutive low-level DC data, the data includes no noise data.

In a CD player or the like, a 16-bit digital audio signal is muted by using a signal processing device as shown in FIG. 1. That is, the time of a 0000h portion of a 16-bit digital audio signal supplied via an input terminal 51 is measured by a silence portion detecting circuit 52. If the measurement result is equal to or longer than a predetermined time period, the measured portion is regarded as "silence", and an analog audio signal supplied via a digital-to-analog (D/A) converter 53 and a filter and amplifier 54 is electrically muted by a muting circuit 55.

At the time of silence, noise generated by the D/A converter 53 and residual noise of a low-pass filter, a line amplifier and the like are not outputted. Therefore, the signal-to-noise ratio (hereinafter referred to as S/N ratio) may be improved.

Meanwhile, it has been recently considered to apply a one-bit audio signal obtained by performing sigma-delta ($\Sigma\Delta$) modulation on an analog audio signal, to a recorder or data transmission of high sound quality. The one-bit audio signal obtained by $\Sigma\Delta$ modulation has a very high sampling frequency and a short data word length, specifically, a sampling frequency which is 64 times of 44.1 kHz and a data word length one bit, compared with a multi-bit digital signal having a sampling frequency of 44.1 kHz and a data word length of 16 bits which is used for conventional digital audio. Thus, the one-bit audio signal obtained by $\Sigma\Delta$ modulation is characterized by a wide transmissible frequency band. In addition, even though the signal is the one-bit signal obtained by $\Sigma\Delta$ modulation, a high dynamic range may be secured in a conventional audio band (20 kHz), which is a lower range with respect to an oversampling frequency of 64 times 44.1 kHz.

With the 16-bit digital audio signal, the consecutive 0000h portion may be regarded as a silence portion, as described above. However, in the case of the one-bit audio signal obtained by $\Sigma\Delta$ modulation, the only possible data is a positive maximum value or a negative maximum value without having a value equal to 0, and therefore the silence portion cannot be detected by the above-described technique.

In short, 1 of the one-bit audio signal represents a positive (+) maximum value while 0 represents a negative (−) maximum value. Thus, the intermediate value ±0 between these maximum values cannot be represented by any means. For example, consecutive one-bit audio signals 0 result in continuous output of the (−) maximum value. Therefore, when the one-bit audio signal is used, it is impossible to detect the silence portion and mute the output so as to improve the S/N ratio.

Thus, the present Applicant has proposed, in the U.S. patent Ser. No. 08/754270 (Filing date: Nov. 20, 1996), a technique for recording a one-bit mute signal onto a recording medium with respect to a recording device for the one-bit digital audio signal.

However, the above application discloses a method of recording a mute signal onto a recording medium but does not disclose any specific example relating to reproduction in which the one-bit digital mute signal recorded on the recording medium is extracted and muted.

SUMMARY OF THE INVENTION

In view of the foregoing status of the art, it is an object of the present invention to provide a signal processing device which is capable of detecting a silence portion by using one-bit digital audio data having only a (+) maximum value and a (−) maximum value, and muting the output so as to improve the S/N ratio.

In a signal processing device according to the present invention, when it is judged that a count indicating that frame patterns are coincident with each other and that an integral value of the frame is a predetermined value has been continued for a predetermined period or longer, a one-bit signal output is muted.

Also, in a signal processing device according to the present invention, when a count indicating that the frame pattern is the same as a predetermined reference pattern has been continued for a predetermined period or longer, a one-bit signal output is muted.

DETAILED DESCRIPTION OF THE INVENTION

Preferred embodiments of the signal processing device according to the present invention will now be described with reference to the drawings.

In this embodiment, a one-bit audio signal muting device for performing mute processing on a one-bit audio signal obtained by sigma-delta ($\Sigma\Delta$) modulation is employed.

Figure 1:
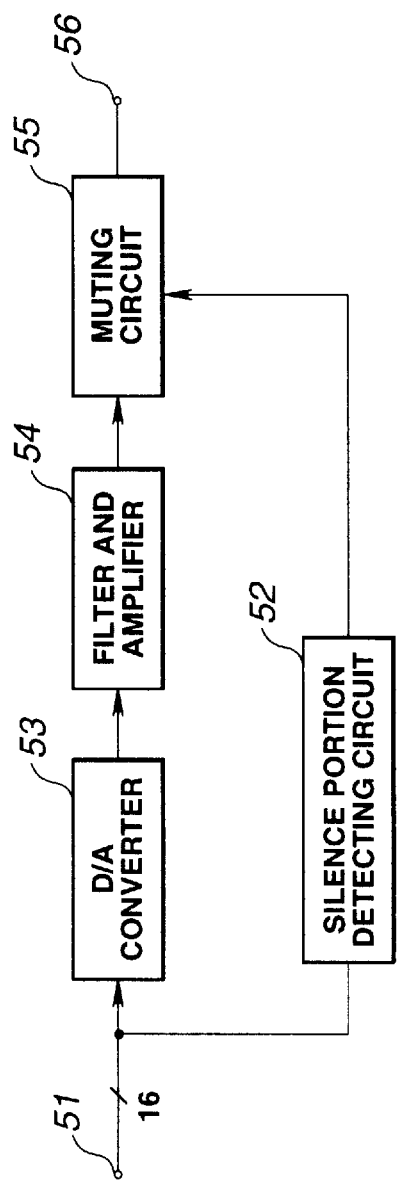
FIG. 1 is a block diagram for illustrating mute processing on a conventional multi-bit digital audio signal.
Figure 2:
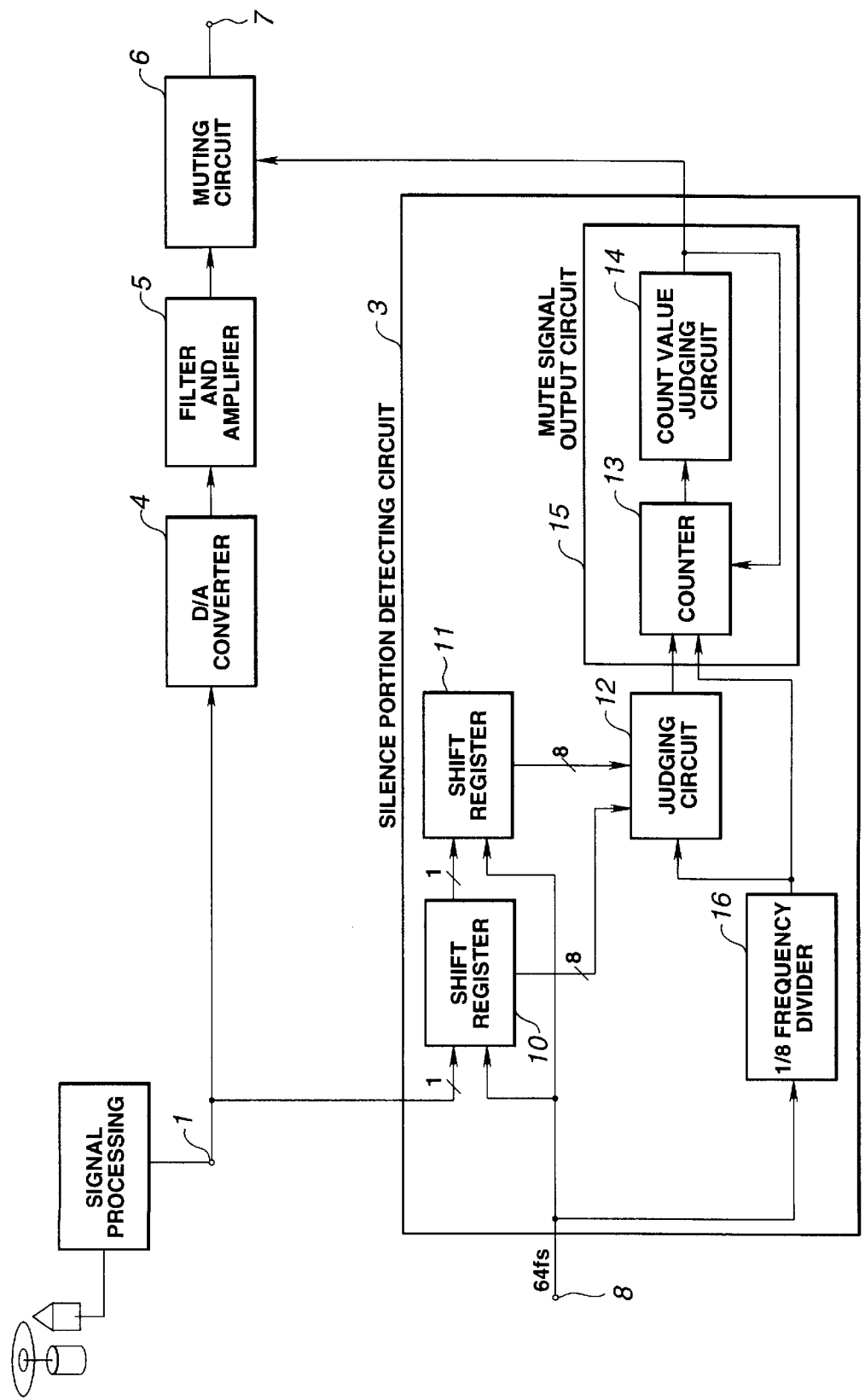
FIG. 2 is a block diagram for illustrating mute processing on a one-bit digital audio signal according to the present invention.

In the one-bit audio signal muting device, as shown in FIG. 2, a silence portion of a one-bit audio signal reproduced from an optical disc on which one-bit digital signals are recorded in advance is detected by a silence portion detecting circuit 3, and in response to the detection result, an analog audio signal supplied via a D/A converter 4 and a filter and amplifier 5 is muted by a muting circuit 6.

The silence portion detecting circuit 3 includes a judging circuit 12 for blocking a signal by every 8 samples (8 bits) by shift registers 10 and 11, and judging coincidence of each frame pattern of 8-bit length and whether an integral value of each frame is 4. The silence portion detecting circuit 3 also includes a counter 13 for counting a state where two of the frame patterns are coincident with each other and where the integral value of the frames is 4 on the basis of the judgment result of the judging circuit 12. The silence portion detecting circuit 3 further includes a count value judging circuit 14 for judging whether the count value of the counter 13 is consecutive for 300 msec or longer, and a muting circuit 6 for muting an analog audio signal supplied via the D/A converter 4 and the filter and amplifier 5 on the basis of the judgment result of the count value judging circuit 14.

The counter 13 and the count value judging circuit 14 constitute a mute signal output circuit 15, which outputs a mute signal for causing the muting circuit 6 to perform mute processing in response to the judgment result of the judging circuit 12.

Figure 3:
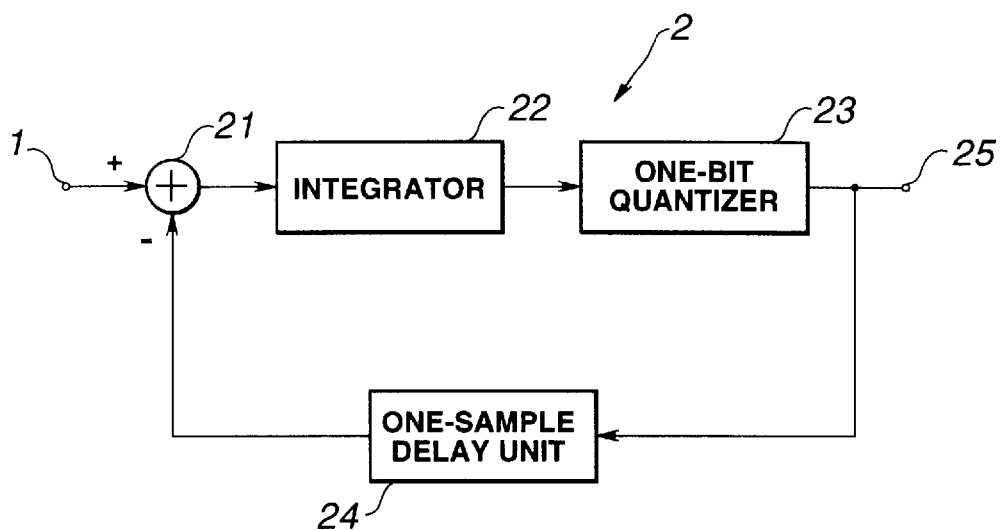
FIG. 3 is a block diagram showing an internal structure of a $\Sigma\Delta$ modulator adapted for the present invention.

A $\Sigma\Delta$ modulator 2, as shown in FIG. 3, outputs a one-bit audio signal by performing $\Sigma\Delta$ modulation on the analog audio signal supplied via an input terminal 1, by using a clock of 64xfs which is 64 times the sampling frequency (fs=44.1 kHz) used for a compact disc (CD).

An exemplary structure of this $\Sigma\Delta$ modulator 2 is shown in FIG. 3. An analog audio signal inputted from the input terminal 1 is supplied via an adder 21 to an integrator 22. An integral value from the integrator 22 is supplied to a one-bit quantizer 23, where the integral value is compared with a mid-point potential of the analog audio signal so as to be one-bit quantized for every one-sample period. The one-bit audio signal generated by the one-bit quantization is supplied to a one-sample delay unit 24, where the signal is delayed by one-sample period. The delayed signal is supplied to the adder 21, where the delayed signal is added to the analog audio signal. The output of the adder 21 is outputted as a one-bit audio signal from an output terminal 25 via the integrator 22 and the one-bit quantizer 23. The one-bit audio signal from the $\Sigma\Delta$ modulator 2 is supplied to the silence portion detecting circuit 3 and the D/A converter 4.

The one-bit audio signal supplied to the silence portion detecting circuit 3 is blocked by every 8 samples (8 bits) by the shift registers 10 and 11. The shift registers 10 and 11 output 8-bit parallel data, respectively, in synchronization with the clock of 64xfs inputted from a clock input terminal 8. In this embodiment, the 8-bit parallel data is referred to as a frame.

The 8-bit parallel data (frame) outputted by the shift register 10 includes one-bit data inputted one sample before to the silence portion detecting circuit 3, one-bit data inputted two samples before, one-bit data inputted three samples before, . . . and one-bit data inputted eight samples before. The 8-bit parallel data (frame) outputted by the shift register 11 includes one-bit data inputted nine samples before to the silence portion detecting circuit 3, one-bit data inputted 10 samples before, one-bit data inputted 11 samples before, . . . and one-bit data inputted 16 samples before. Thus, the shift registers 10 and 11 block the one-bit data after every 8 bits.

The judging circuit 12 compares the two consecutive 8-bit parallel frames outputted by the shift registers 10 and 11. Specifically, the judging circuit 12 judges whether the frame patterns are coincident with each other and whether the integral value of the frames is 4. In this case, the judging circuit 12 carries out the judgment in synchronization with a clock generated by dividing the clock of 64xfs supplied from the clock input terminal 8 by a ⅛ frequency divider 16.

For example, when the input data is "11001100110011001100 . . . ", the first "11001100" is outputted from the shift register 11 while the subsequent 8-sample data "11001100" is outputted from the shift register 10. In this case, since the 8-bit parallel data inputted to the judging circuit 12 are totally the same, the judging circuit 12 regards the patterns as repeat of a simple pattern.

In addition, the judging circuit 12 adds all bits of the output "11001100" from the shift register 10 to one another. In this case, since there are four "1", the addition result is 4. "1" of the one-bit data obtained by the $\Sigma\Delta$ modulator 2 represents "+1" while "0" represents "−1". Therefore, there are four "1" and four "−1" in 8-bit data so that the total sum is 0. Thus, the judging circuit 12 judges that the DC component of this one-bit data is 0.

According to the two types of judgment carried out by the judgment circuit 12, it is found that 16 samples of the input one-bit data include the "repeat of a simple pattern" and the "DC component 0". The judging circuit 12 then sends an instruction of count-up to the counter 13, which is included in the mute signal output circuit 15.

If "1" is supplied to the counter 13 from the judging circuit 12, the counter 13 carries out one-step count-up in response to "1". If "0" is supplied from the judging circuit 12, the counter 13 resets the count. In this case, the count of the counter 13 is synchronous with the clock divided by the ⅛ frequency divider 16.

If the subsequent one-bit data supplied to the silence portion detecting circuit 3 continues as "110011001100 . . . ", the judging circuit 12 similarly determines the "repeat of a simple pattern" and the "DC component 0" and causes the counter 13 to continue count-up. However, if the one-bit data has an irregular pattern, such as, "1111000110110101 . . . " and the integral value is not 4, the judging circuit 12 supplies "0" to the counter 13 to send an instruction of counter clear thereto. On receiving the instruction, the counter 13 clears the counted up data to 0.

The count value judging circuit 14 judges whether the count value at the counter 13 has been continued to correspond to 300 msec. If the count value has been continued, the count value judging circuit 14 outputs a mute signal for causing the muting circuit 6 to execute the mute processing. This is because the state of the "repeat of a simple pattern" and the "DC component 0" has been continued over a long period of time and hence may be regarded as "silence".

On receiving the mute signal from the count value judging circuit 14, which is included in the mute signal output circuit 15, the muting circuit 6 electrically mutes the output by using a transistor or the like.

Thus, according to this one-bit audio signal muting device, since the output may be electrically muted at the muting circuit 6 in the case where a silence portion exists, noise generated by the D/A converter 4 and the filter and amplifier 5 may be restrained.

Figure 4:
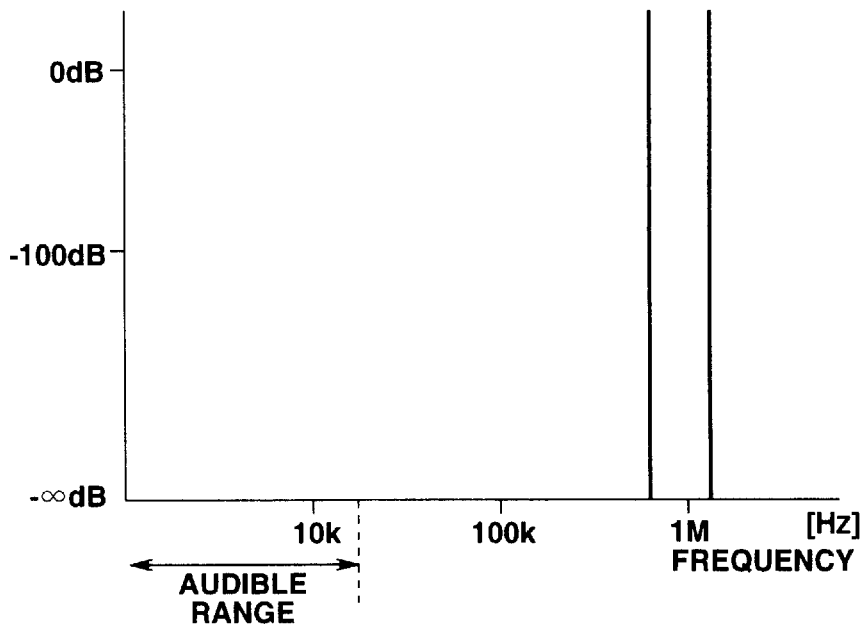
FIG. 4 shows frequency characteristics according to a signal spectrum of a mute signal.

Even when the portion indicating the mute state of the one-bit data inputted to the silence portion detecting circuit 3 is the repeat of "10101010 . . . ", "10010110 . . . ", or "11110000 . . . ", the portion may be similarly detected. This is because a state where the level of the one-bit data is −∞ in an audible range as shown in FIG. 4 corresponds only to the repeat of a simple pattern formed by the same number of "1" and "0", such as, "10101010 . . . ", "1100110011001100 . . . ", "10010110 . . . ", or "11110000 . . . ". In this state, the signal has only a single or a small number of frequency components of approximately several MHz, as shown in FIG. 4, and the audible range is −∞.

Figure 5:
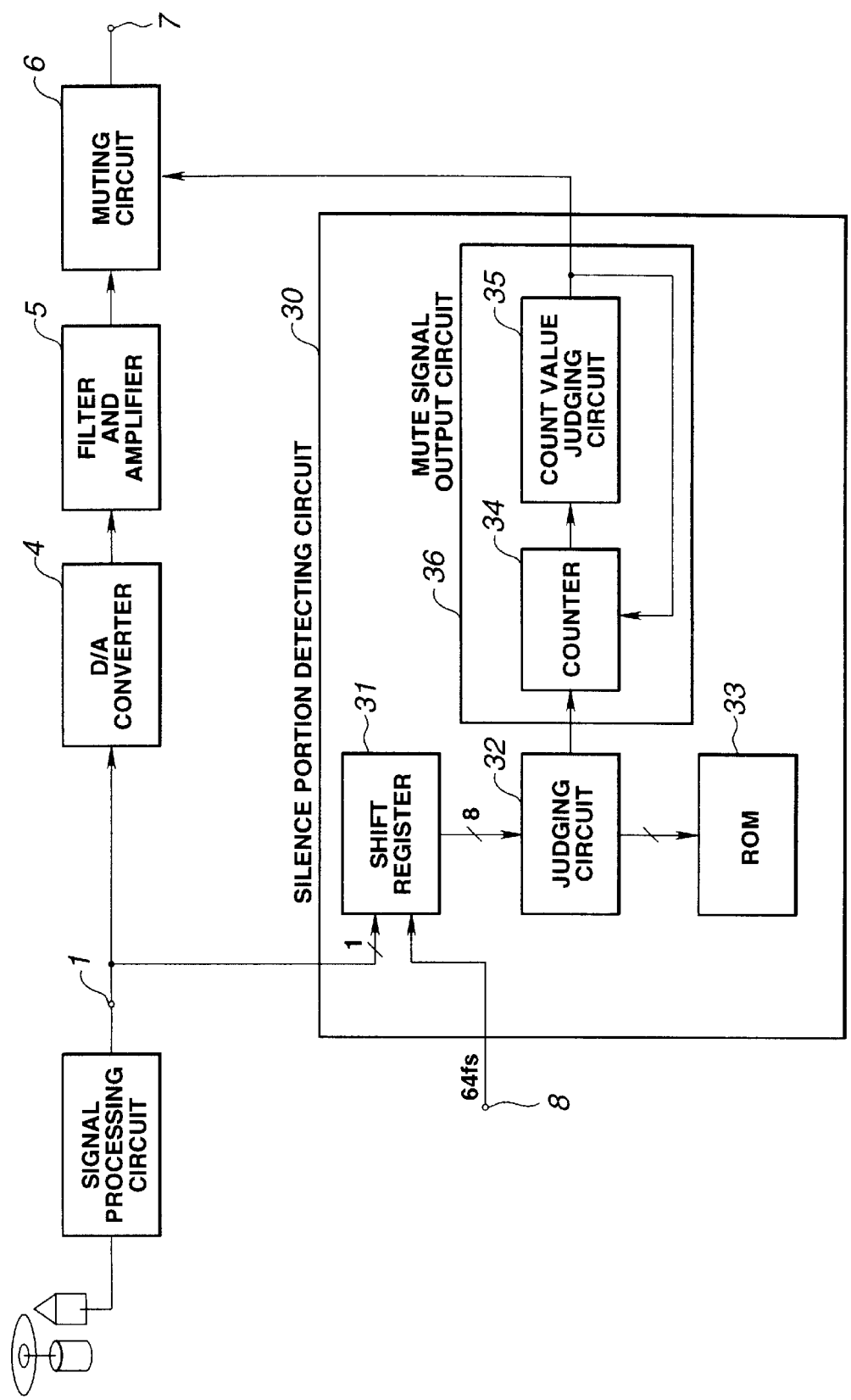
FIG. 5 is block diagram for illustrating another mute processing on the one-bit digital audio signal according to the present invention.

Another embodiment of the signal processing device according to the present invention will now be described with reference to FIG. 5. In this embodiment, too, a one-bit audio signal muting device for performing mute processing on a one-bit audio signal obtained by $\Sigma\Delta$ modulation is employed. As shown in FIG. 5, a silence portion of a one-bit audio signal $\Sigma\Delta$ modulated by a $\Sigma\Delta$ modulator 2 is detected by a silence portion detecting circuit 30, and in response to the detection result, an analog signal supplied via a D/A converter 4 and a filter and amplifier 5 is muted by a muting circuit 6. In this embodiment, the parts performing operations similar to those shown in FIG. 2 are denoted by the same numerals and will not be described further in detail.

The silence portion detecting circuit 30 includes a judging circuit 32 for judging whether the pattern of a frame of 8-bit length obtained by blocking the one-bit audio signal after every 8-bit length by a shift register 31 is the same as a predetermined reference pattern stored in a ROM 33. The silence portion detecting circuit 30 also includes a counter 34 for counting the number of coincidences when the judging circuit 32 judges the coincidences between the frame pattern and the reference pattern, and for resetting the count value when the judging circuit 32 judges non-coincidence. The silence portion detecting circuit 30 further includes a count value judging circuit 35 for judging whether or not the count value of the counter 34 is consecutive for 300 msec or longer, and the muting circuit 6 for muting the analog audio signal supplied via the D/A converter 4 and the filter and amplifier 5 on the basis of the judgment result of the count value judging circuit 35.

The counter 34 and the count value judging circuit 35 constitute a mute signal output circuit 36, which outputs a mute signal for causing the muting circuit 6 to execute mute processing on the basis of the judgment result of the judging circuit 32.

In the one-bit audio signal muting device shown in FIG. 5 as another embodiment, the pattern and timing of the 8-bit length indicating a mute state are determined in advance and stored in the ROM 33 as a reference pattern of a fixed level 0.

Therefore, the judging circuit 32 can judge whether the 8 samples of the input one-bit data are the "repeat of a simple pattern" and the "DC component 0", simply by judging whether parallel data (frame) of 8-bit length supplied from the shift register 31 is coincident with the reference pattern of 0 level stored in the ROM 33.

The judging circuit 32 then sends an instruction of count-up to the counter 34, which is included in the mute signal output circuit 36.

If "1" is supplied to the counter 34 from the judging circuit 32, the counter 34 performs one-step count-up of the count value in response to "1". If "0" is supplied from the judging circuit 32, the counter 34 resets the count value.

If the subsequent one-bit data supplied to the silence portion detecting circuit 30 is the same as the 8-bit reference pattern stored in the ROM 33 on the 8-bit-length basis, the judging circuit 32 similarly determines the "repeat of a simple pattern" and the "DC component 0" to cause the counter 34 to continue count-up. However, if the one-bit data is not coincident with the reference pattern and instead has an irregular pattern, the judging circuit 32 supplies "0" to the counter 34 so as to send an instruction of counter clear thereto. On receiving the instruction, the counter 34 clears the counted up data to 0.

The count value judging circuit 35 judges whether the count value at the counter 34 has been continued to correspond to 300 msec. If the count value has been continued, the count value judging circuit 35 outputs a mute signal for causing the muting circuit 6 to execute the mute processing. This is because the state of the "repeat of a simple pattern" and the "DC component 0" has been continued over a long period of time and hence may be regarded as "silence".

On receiving the mute signal from the count value judging circuit 35, which is included in the mute signal output circuit 36, the muting circuit 6 electrically mutes the output by using a transistor or the like.

Thus, according to this one-bit audio signal muting device, since the output may be electrically muted at the muting circuit 6 in the case of silence, noise generated by the D/A converter 4 and the filter and amplifier 5 may be restrained.

In the signal processing device according to the present invention, when it is judged that a count indicating that the frame patterns are coincident with each other and that the integral value of the frame is a predetermined value has been continued for a predetermined period or longer, the corresponding portion is regarded as silence and the output is muted, thereby improving the S/N ratio.

Also, in the signal processing device according to the present invention, when a count indicating that the frame pattern is the same as a predetermined reference pattern has been continued for a predetermined period or longer, the corresponding portion is regarded as silence and the output is muted, thereby improving the S/N ratio.

What is claimed is:

1. A signal processing device comprising:
   judging means for judging coincidence of adjacent frame patterns of frames having a predetermined bit length obtained by blocking a sigma-delta modulated one-bit signal after every predetermined bit length, and for judging whether an integral value of a frame is a predetermined value;
   counting means for counting a case where said adjacent frame patterns are coincident and where said integral value of said frame is said predetermined value on a basis of a judgment result of said judging means;
   discriminating means for judging that a count at said counting means has been continued for a predetermined period or longer; and
   muting means for muting a one-bit signal output on a basis of a judgment result of said discriminating means.

2. The signal processing device as claimed in claim 1, wherein said judging means judges coincidence of adjacent frame patterns having only frequency components outside of an audible range and with a level within said audible range being a negative maximum value.

3. The signal processing device as claimed in claim 1, wherein said muting means mutes said one-bit signal output when said discriminating means judges a continuation of said count of said counting means for said predetermined period or longer, and releases muting when said discriminating means does not judge said continuation for said predetermined period or longer.

4. A signal processing device comprising:
   judging means for judging whether a frame pattern of a predetermined length obtained by blocking a sigma-delta modulated one-bit signal after every predetermined bit length is the same as a predetermined reference pattern;
   counting means for counting a number of coincidences when said judging means judges coincidence between said frame pattern and said predetermined reference pattern, while resetting a count value when said judging means judges non-coincidence;

discriminating means for judging that a count at said counting means has been continued for a predetermined period or longer; and muting means for muting a one-bit signal output on a basis of a judgment result of said discriminating means.

5. The signal processing device as claimed in claim 4, wherein said muting means mutes said one-bit signal output when said discriminating means judges a continuation of said count of said counting means for said predetermined period or longer and releases muting when said discriminating means does not judge said continuation for said predetermined period or longer.

* * * * *